United States Patent
Hashimoto et al.

(10) Patent No.: US 7,264,866 B2
(45) Date of Patent: Sep. 4, 2007

(54) LAMINATE FILM

(75) Inventors: Katsuyuki Hashimoto, Gifu (JP); Makoto Handa, Gifu (JP)

(73) Assignee: Teijin Dupont Films Japan Limited, Tokyo (JP)

( * ) Notice: Subject to any disclaimer, the term of this patent is extended or adjusted under 35 U.S.C. 154(b) by 0 days.

(21) Appl. No.: 10/542,802

(22) PCT Filed: Jan. 20, 2004

(86) PCT No.: PCT/JP2004/000439

§ 371 (c)(1),
(2), (4) Date: Jul. 20, 2005

(87) PCT Pub. No.: WO2004/065120

PCT Pub. Date: Aug. 5, 2004

(65) Prior Publication Data

US 2006/0121299 A1    Jun. 8, 2006

(30) Foreign Application Priority Data

Jan. 21, 2003  (JP) ............................. 2003-012115

(51) Int. Cl.
- B32B 7/02 (2006.01)
- B32B 27/06 (2006.01)
- B32B 27/18 (2006.01)
- B32B 27/30 (2006.01)
- B32B 27/36 (2006.01)

(52) U.S. Cl. .................... 428/212; 428/323; 428/480; 428/483; 526/258; 526/529; 526/260; 526/310; 526/312; 526/317.1; 526/318; 526/318.3; 526/318.4; 526/318.41; 526/318.43; 526/318.44; 526/318.5; 526/319; 526/325; 526/326; 526/328; 526/328.5; 526/329.7

(58) Field of Classification Search .................... None
See application file for complete search history.

(56) References Cited

U.S. PATENT DOCUMENTS

| | | | | |
|---|---|---|---|---|
| 4,310,687 A | * | 1/1982 | Barabas et al. | 560/221 |
| 4,495,325 A | * | 1/1985 | DeBergalis et al. | 524/507 |
| 4,585,693 A | * | 4/1986 | DeBergalis et al. | 428/324 |
| 5,191,045 A | * | 3/1993 | Funaki et al. | 526/259 |
| 5,565,501 A | * | 10/1996 | Hosokawa et al. | 522/83 |
| 6,165,602 A | * | 12/2000 | Fujita | 428/216 |
| 6,194,061 B1 | * | 2/2001 | Satoh et al. | 428/341 |
| 6,242,081 B1 | * | 6/2001 | Endo | 428/212 |
| 6,329,041 B1 | * | 12/2001 | Tsuchiya et al. | 428/195.1 |
| 6,589,649 B2 | * | 7/2003 | Oya et al. | 428/343 |
| 2003/0008162 A1 | * | 1/2003 | Oya et al. | 428/480 |

FOREIGN PATENT DOCUMENTS

| | | | |
|---|---|---|---|
| JP | 53-40627 B | | 10/1978 |
| JP | 57-6470 B2 | | 2/1982 |
| JP | 59-12952 A | | 1/1984 |
| JP | 4-2101 B2 | | 1/1992 |
| JP | 08-092391 A | * | 4/1996 |
| JP | 09-141808 A | * | 6/1997 |
| JP | 9-156056 A | | 6/1997 |
| JP | 9-234839 A | | 9/1997 |
| JP | 9-239921 A | | 9/1997 |
| JP | 9-262939 A | | 10/1997 |
| JP | 11-34519 A | | 2/1999 |
| JP | 11-91025 A | | 4/1999 |
| JP | 2001-315262 A | | 11/2001 |
| JP | 2002-121307 | * | 4/2002 |
| JP | 2002-121307 A | | 4/2002 |
| JP | 2002-155156 A | | 5/2002 |
| JP | 2002-210906 A | | 7/2002 |
| WO | WO94/22932 | * | 10/1994 |
| WO | 9-239921 A | | 9/1997 |

OTHER PUBLICATIONS

International Search Report for PCT/JP2004/000439; date of mailing May 11, 2004.

* cited by examiner

*Primary Examiner*—Vivian Chen
(74) *Attorney, Agent, or Firm*—Sughrue Mion, PLLC

(57) ABSTRACT

The object of the present invention is to provide a laminated film excellent in light resistance, scratch resistance, transparency, dimensional stability and adhesion to a hard coating layer. The present invention is a laminated film comprising a base material layer, an easily adhering layer and a hard coating layer, wherein the easily adhering layer is formed on the base material layer and the hard coating layer is formed on the easily adhering layer, and further wherein (1) the base material layer is formed of a polyester resin formed from naphthalenedicarboxylic acid as a main dicarboxylic acid component and ethylene glycol as a main glycol component, (2) the hard coating layer has an ultraviolet absorbing function and has a pencil hardness of H or higher on the hard coating layer surface, and (3) said laminated film has a variation ($\Delta b^*$) of less than 2.0 between transmittance $b^*$ values obtained before and after a 300 hours' xenon arc test of said laminated film.

13 Claims, No Drawings

LAMINATE FILM

TECHNICAL FIELD

The present invention relates to a laminated film comprising a base material layer, an easily adhering layer and a hard coating layer. More specifically, it relates to a laminated layer excellent in light resistance, scratch resistance, transparency, dimensional stability and adhesion to the hard coating layer.

TECHNICAL BACKGROUND

Polyester films, particularly, biaxially oriented films formed of polyethylene terephthalate or polyethylene naphthalate have excellent mechanical properties, heat resistance and chemical resistance. They are therefore widely used as materials for a magnetic tape, a ferromagnetic thin tape, a photographic film, a packaging film, a film for electronic parts, an electrically insulating film, a film for metal laminates, a film to be attached to the surface of a display, etc., a film for protection of various parts, and the like.

In recent years, polyester films are used as films particularly for various optical devices, and they are used in the fields of a prism lens sheet that is a member of a liquid crystal display, a base film for a touch panel, a backlight, etc., a base film for anti-reflection, an electromagnetic shield film for a plasma display, a base film for an organic EL display, an anti-exposure base film for a display, and the like. Base films for such optical films are required to have excellent transparency and light resistance. However, polyester films are deteriorated by ultraviolet light to cause changes in physical properties, such as discoloration, a decrease in mechanical strength, and the like. In the use thereof for a display, discoloration caused by light deterioration impairs the color balance of the display, so that there has been a problem that a film having poor light resistance cannot be used.

As means of improving polyester films in light resistance, there have been hitherto known a polyester film having an ultraviolet absorbent kneaded thereinto (Patent Document 1), a laminated film formed by mixing an ultraviolet absorbent with an acrylic resin, coating the mixture on a polyester film surface and drying the thus-formed coating (Patent Document 2), a film formed by adjusting the refractive index and density of a polyethylene naphthalate film to specific ranges (Patent Document 3), a film formed by stacking two layers consisting of a resin layer formed of a benzotriazole-based-monomer-copolymerized acrylic resin and a surface-hardening layer having a pencil hardness of H or higher on a thermoplastic film (Patent Document 4), and the like.

(Patent Document 1) JP-B-57-6470
(Patent Document 2) JP-B-H4-2101
(Patent Document 3) JP-B-53-40627
(Patent Document 4) JP-A-H9-234839

DISCLOSURE OF THE INVENTION

However, conventional polyester films have the following defects. That is, although the film having an ultraviolet absorbent kneaded thereinto has an effect against the deterioration of a polyester film in strength and elongation, the film has a defect that since deterioration proceeds on the film surface, the film is degraded in haze and transparency.

Further, the laminated film formed by mixing an ultraviolet absorbent with an acrylic resin, coating the mixture on a polyester film surface and drying the thus-formed coating has a defect that it cannot maintain light resistance required for use in a display since such films vary depending upon dispersibility of the ultraviolet absorbent contained.

While the film using a polyethylene naphthalate having a refractive index and a density in specific ranges produces effects to some extent, it cannot have light resistance satisfying demands.

The film formed by stacking two layers consisting of a resin layer formed of a benzotriazole-based-monomer-copolymerized acrylic resin and a surface-hardening layer having a pencil hardness of H or higher on a thermoplastic film is excellent in scratch resistance. However, its constitution is complicated, and the adhesion to the hard coating layer is sometimes poor.

When a polyethylene terephthalate film (to be sometimes referred to as "PET film") and a polyethylene naphthalene dicarboxylate film (PEN film) as films for use as base material layers are compared, the PET film is excellent over the PEN film in light resistance, but it is sometimes not sufficient in dimensional stability. The PET film is therefore liable to shrink due to heat treatment in the process of producing a display, and sometimes involves a dimensional stability problem.

On the other hand, the PEN film is excellent over the PET film in dimensional stability and excellent over the PET film as a base material for a display as described above, but the defect thereof is that it is poor in light resistance.

It is an object of the present invention to overcome the above problems and to provide a laminated film excellent in light resistance (weathering resistance), scratch resistance, transparency, dimensional stability and adhesion to a hard coating layer.

According to the present invention, there is provided a laminated film comprising a base material layer, an easily adhering layer and a hard coating layer, wherein the easily adhering layer is formed on the base material layer and the hard coating layer is formed on the easily adhering layer, and further wherein (1) the base material layer is formed of a polyester resin formed from naphthalenedicarboxylic acid as a main dicarboxylic acid component and ethylene glycol as a main glycol component, (2) the hard coating layer has an ultraviolet absorbing function and has a pencil hardness of H or higher on the hard coating layer surface, and (3) said laminated film has a variation ($\Delta b^*$) of less than 2.0 between transmittance $b^*$ values obtained before and after a 300 hours' xenon arc test of said laminated film.

That is, the present invention has a characteristic feature in that by a hard coating layer having a specific ultraviolet absorbing function overcomes the defect of a PEN film concerning light resistance while the excellent transparency and dimensional stability of the PEN film is maintained.

Further, the present invention has a characteristic feature in that the hard coating layer is improved in adhesion by providing an easily adhering layer between the base material layer and the hard coating layer.

Further, the present invention has a characteristic feature in that the scratch resistance is improved by means of the hard coating layer having a specific pencil hardness.

The laminated film of the present invention has a variation ($\Delta b^*$) of less than 2.0 in transmittance $b^*$ values, so that it can prevent a color imbalance caused in the field of a display, and the like. The above variation in the transmittance $b^*$ values are evaluated by a method to be described later.

BEST MODES OF THE INVENTION

<Base Material Layer>

In the present invention, the polyester resin constituting the base material layer is a polyester formed from naphthalenedicarboxylic acid as a main dicarboxylic acid component and ethylene glycol as a main glycol component. The above "main" means that a component occupies at least 90 mol %, preferably at least 95%, based on each constituting component.

Examples of the naphthalenedicarboxylic acid include 2,6-naphthalenedicarboxylic acid, 2,7-naphthalenedicarboxylic acid and 1,5-naphthalenedicarboxylic acid, and of these, 2,6-naphthalenedicarboxylic acid is preferred.

When the polyester is a copolymer, a compound having a molecule containing two ester-forming functional groups can be used as a comonomer for constituting the copolymer. Examples of the dicarboxylic acid component for the copolymerization include oxalic acid, adipic acid, phthalic acid, sebacic acid, dodecanedicarboxylic acid, isophthalic acid, terephthalic acid, 1,4-cyclohexanedicarboxylic acid, 4,4'-diphenyldicarboxylic acid, phenylindanedicarboxylic acid, 2,7-naphthalenedicarboxylic acid, tetralindicarboxylic acid, decalindicarboxylic acid and diphenyl ether dicarboxylic acid. As a hydroxycarboxylic acid, further, there are also included hydroxycarboxylic acids such as p-hydroxybenzoic acid and p-hydroxyethoxybenzoic acid.

The glycol component for the copolymerization includes propylene dihydric alcohols such as propylene glycol, trimethylene glycol, tetramethylene glycol, hexamethylene glycol, cyclohexanemethylene glycol, neopentyl glycol, an ethylene oxide adduct of bisphenol sulfone, an ethylene oxide adduct of bisphenol A, diethylene glycol and polyethylene oxide glycol.

These compounds may be used singly, or two or more compounds of them may be used. Of these, as a dicarboxylic acid component, isophthalic acid, terephthalic acid, 4,4'-diphenyldicarboxylic acid, 2,7-naphthalenedicarbxoylic acid and p-hydroxybenzoic acid are preferred. As a glycol component, trimethylene glycol, hexamethylene glycol, neopentyl glycol and an ethylene oxide adduct of bisphenolsulfone are preferred.

Further, the polyethylene-2,6-naphthalenedicarboxylate may be a compound having some or all of its terminal hydroxyl groups and/or carboxyl groups blocked with a monofunctional compound such as benzoic acid, methoxypolyalkylene glycol, or the like, or it may be a compound obtained by copolymerization that is carried out with a very small amount of a trifunctional or higher ester-forming compound such as glycerin, pentaerythritol, or the like to such an extent that a substantially linear polymer can be obtained.

The polyester resin for the base material layer can be produced by a conventionally known method. For example, there is a method in which a low-polymerization-degree polyester is obtained directly by a reaction between a dicarboxylic acid and a glycol. Further, it can be obtained by a method in which a lower alkyl ester of a dicarboxylic acid and a glycol are reacted in the presence of a conventionally known ester-exchange catalyst and then a polymerization reaction is carried out in the presence of a polymerization catalyst.

Examples of the ester-exchange catalyst include compounds containing sodium, potassium, magnesium, calcium, zinc, strontium, titanium, zirconium, manganese and cobalt, and one or at least two members of these are used. The polymerization catalyst can be selected from antimony compounds such as antimony trioxide and antimony pentoxide, germanium compounds typified by germanium dioxide, or titanium compounds such as tetraethyl titanate, tetrapropyl titanate, tetraphenyl titanate, partially hydrolysis products of these, titanylammonium oxalate, titanylpotassium oxalate and titanium trisacetyl acetonate.

When the polymerization is carried out after the ester-exchange reaction, generally, a phosphorus compound such as trimethyl phosphate, triethyl phosphate, tri-n-butyl phosphate, orthophosphoric acid, or the like is added for deactivating the ester-exchange catalyst before the polymerization. The content of phosphorus element in the polyethylene-2,6-naphthalenedicarboxylate is preferably 20 to 100 weight ppm from the viewpoint of thermal stability of the polyester. In addition, there may be employed a constitution in which the polyester is prepared into chips after melt polymerization and further polymerized in a solid phase under heat and reduced pressure or in the current of an inert gas such as nitrogen.

The polyester resin for the base material layer is preferably a polyester of which at least 90 mol % is formed of an ethylene naphthalenedicarboxylate unit represented by —O—CH$_2$CH$_2$—O—CO-Q-C-(Q represents naphthalenedily). Specifically, a polyester of which at least 90 mol % is formed of an ethylene-2,6-naphthalenedicarboxylate unit is preferred, a polyester of which at least 95 mol % is formed of an ethylene-2,6-naphthalenedicarboxylate unit is more preferred, and a polyester of which at least 97 mol % is formed of an ethylene-2,6-naphthalenedicarboxylate unit is still more preferred.

The intrinsic viscosity of the polyester resin is preferably 0.40 dl/g or more, more preferably 0.40 to 0.9 dl/g. When the intrinsic viscosity is too low, the step is frequently discontinued in some cases. When the intrinsic viscosity is too high, the polyester resin has a high melt viscosity, so that its melt-extrusion is difficult. Further, the polymerization takes a longer time, which is uneconomical and is not preferred.

In the present invention, further, it is preferred in view of an improvement in light resistance to add an ultraviolet absorbent to the polyester resin for constituting the base material layer. Particularly, the content of an ultraviolet-absorbing compound in the base material is preferably 0.1 to 5% by weight, more preferably 0.2 to 3% by weight, since there can be prevented a decrease in light resistance caused by deficiency of the ultraviolet-absorbing compound and the deterioration of mechanical properties caused by a decrease in polymerization degree due to an excess of the ultraviolet-absorbing compound.

Examples of the above ultraviolet absorbent preferably include known ultraviolet absorbents such as a salicylic-acid-containing compound, a benzophenone-containing compound, a benzotriazole-containing compound, a cyclic-imino-ester-containing compound, and the like. Of these, a benzophenone-containing compound, a benzotriazole-containing compound and a cyclic-imino-ester-containing compound are preferred. As a compound to be incorporated into the polyester, a cyclic-imino-ester-containing compound is particularly preferred.

Examples of the benzophenone-containing compound preferably include 2,4-dihydroxybenzophenone, 2,2'-dihydroxy-4-methoxybenzophenone, etc., and examples of the above benzotriazole-containing compound preferably include 2-(2'-hydroxy-5'-t-butylphenyl)benzotriazole, and the like.

As a cyclic-imino-ester compound, it is preferred to use at least one compound selected from a cyclic imino ester of the following formula (I) or (II) in an unreacted form. These cyclic-imino-ester compounds are compounds known as ultraviolet absorbents and are described, for example, in JP-A-59-12952.

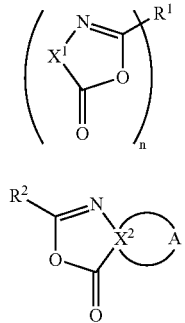

(I)

(II)

In the formula (I), $X^1$ is a divalent aromatic residue in which two bonding hands from $X^1$ shown in the above formula are on the 1-position and the 2-position in positional relationship. n is 1, 2 or 3. $R^1$ is a hydrocarbon residue having a valence of n, and further, it may have a heteroatom. Otherwise, $R^1$ can be a direct bond when n=2.

In the formula (II), A is a group represented by the following formula (II-a) or a group represented by the following formula (II)-b. In the formula (II) and the formula (II)-a or (II)-b, $R^2$ and $R^3$ are the same as, or different from, each other, and are monovalent hydrocarbon residues. $X^2$ is a tetravalent aromatic hydrocarbon residue, and it may further contain a heteroatom.

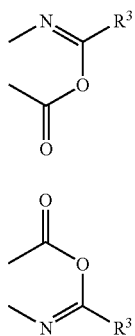

(II)-a (II)-b

Examples of $X^1$ preferably include 1,2-phenylene, 1,2-naphthylene, 2,3-naphthylene and a group represented by the following formula (a) or (b). Of these, 1,2-phenylene is particularly preferred. In the formula (a) or the formula (b), R is —O—, —CO—, —S—, —SO$_2$—, —CH$_2$—, —(CH$_2$)— or —C(CH$_3$)$_2$—.

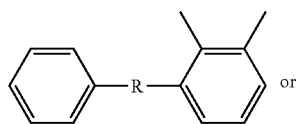

(a)

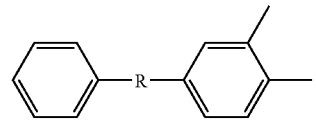

(b)

The aromatic hydrocarbon residues shown with regard to $X^1$ may be substituted with alkyls having 1 to 10 carbon atoms such as methyl, ethyl, propyl, hexyl, decyl, etc.; aryls having 6 to 12 carbon atoms such as phenyl, naphthyl, etc.; cycloalkyls having 5 to 12 carbon atoms such as cyclopentyl, cyclohexyl, etc.; aralkyls having 8 to 20 carbon atoms such as phenylethyl, etc.; alkoxyls having 1 to 10 carbon atoms such as methoxy, ethoxy, decyloxy, etc.; nitro; halogens such as chlorine, bromine, etc.; acyls having 2 to 10 carbon atoms such as acetyl, propionyl, benzoyl, decanoyl, etc.; and the like.

$R^1$ is a hydrocarbon residue having a valence of n (n is 1, 2 or 3), or it can be a direct bond only when n is 2.

(Case Where $R^1$ is a Monovalent Hydrocarbon Group)

Examples of the monovalent hydrocarbon residue (case when n=1) include, first, a non-substituted aliphatic group having 1 to 10 carbon atoms, a non-substituted aromatic group having 6 to 12 carbon atoms and a non-substituted alicyclic group having 5 to 12 carbon atoms.

Examples of the non-substituted aliphatic group having 1 to 10 carbon atoms include methyl, ethyl, propyl, hexyl, decyl, etc., examples of the non-substituted aromatic group having 6 to 12 carbon atoms include phenyl, naphthyl, biphenyl, etc.; and examples of the non-substituted alicyclic group having 5 to 12 carbon atoms include cyclopentyl, cyclohexyl, and the like.

Further, secondly, examples of the above monovalent hydrocarbon moiety include substituted aliphatic moieties or aromatic residues that can be represented by the following formulae (c) to (f).

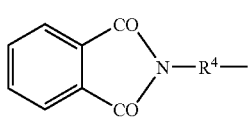

(c)

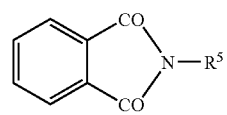

(d)

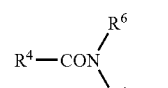

(e)

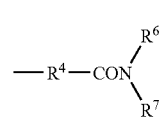

(f)

In the formulae, $R^4$ is an alkylene group having 2 to 10 carbon atoms, a phenylene group or a naphthylene group. $R^5$ is an alkyl having 1 to 10 carbon atoms, phenyl or naphthyl. $R^6$ is a hydrogen atom or any one of groups defined as $R^5$. $R^7$ is a hydrogen atom or any one of groups defined as $R^5$.

Further, thirdly, the above monovalent hydrocarbon residue includes the above non-substituted aromatic residues substituted, for example, with the same substituents as those which are shown as substituents on the aromatic residue represented by the above $X^1$. Examples of the hydrocarbon residue that is substituted with such a substituent therefore include tolyl, methylnaphthyl, nitrophenyl, nitronaphthyl, chlorophenyl, benzoylphenyl, acetylphenyl, acetylnaphthyl, and the like.

The monovalent hydrocarbon residue preferably includes groups represented by the above formula (c), (d), (e) or (f), that is, substituted aliphatic residues or aromatic residues, and of these, substituted aromatic moieties are particularly preferred.

(Case Where $R^1$ is a Divalent Hydrocarbon Group)

Examples of the divalent hydrocarbon residue (case when n=2) include, first, a divalent non-substituted aliphatic group residue having 2 to 10 carbon atoms, a divalent non-substituted aromatic group residue having 6 to 12 carbon atoms and a divalent non-substituted alicyclic group residue having 5 to 12 carbon atoms.

Examples of the divalent non-substituted aliphatic groups having 2 to 10 carbon atoms include ethylene, trimethylene, tetramethylene, decamethylene, etc., examples of the divalent non-substituted aromatic group having 6 to 12 carbon atoms include phenylene, naphthylene, P,P'-biphenylene, and examples of the divalent non-substituted alicyclic group having 5 to 12 carbon atoms include cyclopentylene, cyclohexylene, and the like.

Further, secondly, examples of the above divalent hydrocarbon group residue include a group represented by the following formula (g) and a substituted aliphatic or aromatic group residue represented by the following formula (h).

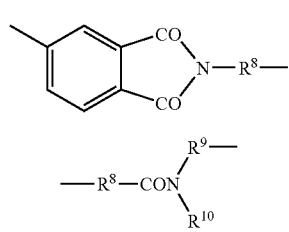

(g)

(h)

In the formulae, $R^8$ is one of the groups defined with regard to $R^4$. $R^9$ is one of the groups defined with regard to $R^4$. $R^{10}$ is one of the groups defined with regard to $R^6$.

Further, thirdly, the above divalent hydrocarbon residue includes the above divalent non-substituted aromatic group substituted, for example, with the same substituents as those which are shown as substituents on the aromatic residue represented by the above $X^1$.

As $R^1$, when n is 2, of these, a direct bond or the above non-substituted or substituted divalent aromatic hydrocarbon residues of the above first to third classes are preferred, non-substituted or substituted aromatic hydrocarbon residues of the first or third class in which two bonding hands are positioned on positions remotest from each other are particularly preferred, and above all, p-phenylene, P,P'-biphenylene or 2,6-naphthylene is preferred.

(Case Where $R^1$ is a Trivalent Hydrocarbon Group)

Examples of the trivalent hydrocarbon residue (case where n=3) include trivalent aromatic group residues having 6 to 12 carbon atoms.

The above aromatic group residues include the following four groups. These aromatic group residues may be substituted with the same substituents as those that are shown as a substituent on the above monovalent aromatic group moieties.

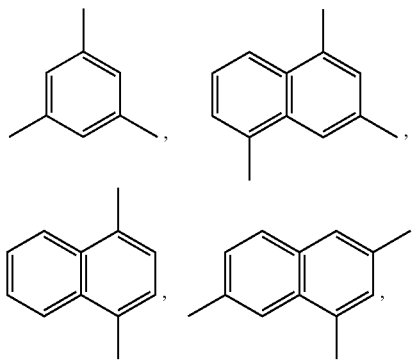

The above $R^2$ and $R^3$ are the same as, or different from, each other, and are monovalent hydrocarbon residues, and $X^2$ is a tetravalent aromatic hydrocarbon residue. $R^2$ and $R^3$ include, for example, the same groups that are shown with regard to $R^1$ when n=1 in the explanation of the above formula (I). The tetravalent aromatic hydrocarbon residue includes the following eight groups, in which R is as defined in the formula (a). These tetravalent aromatic hydrocarbon residues may be substituted with the same substituents as those that are shown as a substituent on the monovalent aromatic group residue represented by $R^1$ in the explanation of the above formula (I).

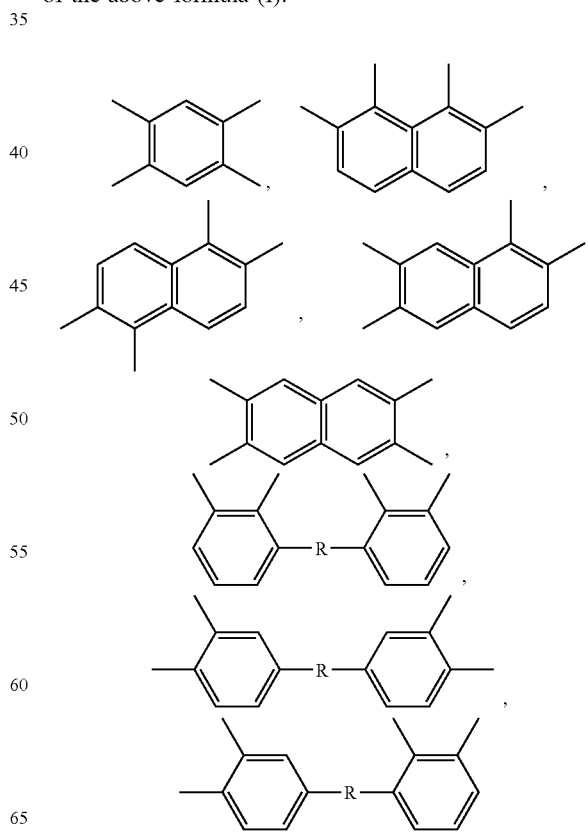

Specific examples of the cyclic imino ester for use in the present invention, represented by the above formulae (I) and (II), include the following compounds.

(Compound of the Above Formula (1), When n=1)

2-Methyl-3,1-benzooxazin-4-one, 2-butyl-3,1-benzooxazin-4-one, 2-phenyl-3,1-benzooxazin-4-one, 2-(1- or 2-naphthy)-3,1-benzooxazin-4-one, 2-(4-biphenyl)-3,1-benzooxazin-4-one, 2-p-nitrophenyl-3,1-benzooxazin-4-one, 2-m-nitrophenyl-3,1-benzooxazin-4-one, 2-p-benzoylphenyl-3,1-benzooxazin-4-one, 2-p-methoxyphenyl-3,1-benzooxazin-4-one, 2-o-methoxyphenyl-3,1-benzooxazin-4-one, 2-cyclohexyl-3,1-benzooxazin-4-one, 2-p- (or m-)phthalimidophenyl-3,1-benzooxazin-4-one, N-phenyl-4-(3,1-benzooxazin-4-one-2-yl)phthalimide, N-benzoyl-4-(3,1-benzooxazin-4-one-2-yl)aniline, N-benzoyl-N-methyl-4-(3,1-benzooxazin-4-one-2-yl)aniline, 2-(p-(N-methylcarbonyl)phenyl)-3,1-benzooxazin-4-one.

(Compound of the Above Formula (I), When n=2)

2,2'-bis(3,1-benzooxazin-4-one), 2,2'-ethylenebis(3,1-benzooxazin-4-one), 2,2'-tetramethylenebis(3,1-benzooxazin-4-one), 2,2'-decamethylenebis(3,1-benzooxazin-4-one), 2,2'-p-phenylenebis(3,1-benzooxazin-4-one), 2,2'-m-phenylenebis(3,1-benzooxazin-4-one), 2,2'-(4,4'-diphenylene)bis(3,1-benzooxazin-4-one), 2,2'-(2,6- or 1,5-naphthylene)bis(3,1-benzooxazin-4-one), 2,2'-(2-methyl-p-phenylene)bis(3,1-benzooxazin-4-one), 2,2'-(2-nitro-p-phenylene)bis(3,1-benzooxazin-4-one), 2,2'-(2-chloro-p-phenylene)bis(3,1-benzooxazin-4-one), 2,2'-(1,4-cyclohexylene)bis(3,1-benzooxazin-4-one), N-p-(3,1-benzooxazin-4-one-2-yl)phenyl, 4-(3,1-benzooxazin-4-one-2-yl)phthalimide, N-p-(3,1-benzooxazin-4-one-2-yl)benzoyl, 4-(3,1-benzooxazin-4-one-2-yl)aniline.

(Compound of the Above Formula (I), When n=3)

1,3,5-tri(3,1-benzooxazin-4-one-2-yl)benzene, 1,3,5-tri(3,1-benzooxazin-4-one-2-yl)naphthalene, 2,4,6-tri(3,1-benzooxazin-4-one-2-yl)naphthalene, (Compound of the Above Formula (II))

2,8-dimethyl-4H,6H-benzo(1,2-d;5,4-d')bis(1,3)-oxazin-4,6-dione, 2,7-dimethyl-4H,9H-benzo(1,2-d;4,5-d')bis(1,3)-oxazin-4,9-dione, 2,8-diphenyl-4H,8H-benzo(1,2-d;5,4-d') bis(1,3)-oxazin-4,6-dione, 2,7-diphenyl-4H,9H-benzo(1,2-d;4,5-d')bis(1,3)-oxazin-4,6-dione, 6,6'-bis(2-methyl-4H,3,1-benzooxazin-4-one), 6,6'-bis(2-ethyl-4H,3,1-benzooxazin-4-one), 6,6'-bis(2-phenyl-4H,3,1-benzooxazin-4-one), 6,6'-methylenebis(2-methyl-4H,3,1-benzooxazin-4-one), 6,6'-methylenebis(2-phenyl-4H,3,1-benzooxazin-4-one), 6,6'-ethylenebis(2-methyl-4H,3,1-benzooxazin-4-one), 6,6'-ethylenebis(2-phenyl-4H,3,1-benzooxazin-4-one), 6,6'-butylenebis(2-methyl-4H,3,1-benzooxazin-4-one), 6,6'-butylenebis(2-phenyl-4H,3,1-benzooxazin-4-one), 6,6'-oxybis(2-methyl-4H,3,1-benzooxazin-4-one), 6,6'-oxybis(2-phenyl-4H,3,1-benzooxazin-4-one), 6,6'-sulfonylbis(2-methyl-4H,3,1-benzooxazin-4-one), 6,6'-sulfonylbis(2-phenyl-4H,3,1-benzooxazin-4-one), 6,6'-carbonylbis(2-methyl-4H,3,1-benzooxazin-4-one), 6,6'-carbonylbis(2-phenyl-4H,3,1-benzooxazin-4-one), 7,7'-methylenebis(2-methyl-4H,3,1-benzooxazin-4-one), 7,7'-methylenebis(2-phenyl-4H,3,1-benzooxazin-4-one), 7,7'-bis(2-methyl-4H,3,1-benzooxazin-4-one), 7,7'-ethylenebis(2-methyl-4H,3,1-benzooxazin-4-one), 7,7'-oxybis(2-methyl-4H,3,1-benzooxazin-4-one), 7,7'-sulfonylbis(2-methyl-4H,3,1-benzooxazin-4-one), 7,7'-carbonylbis(2-methyl-4H,3,1-benzooxazin-4-one), 6,7'-bis(2-methyl-4H,3,1-benzooxazin-4-one), 6,7'-bis(2-phenyl-4H,3,1-benzooxazin-4-one), 6,7'-methylenebis(2-methyl-4H,3,1-benzooxazin-4-one), 6,7'-methylenebis(2-phenyl-4H,3,1-benzooxazin-4-one).

Of the above compounds shown as examples, compounds of the above formula (I), more preferably, compounds of the above formula (I) in which n=2, particularly preferably, compounds of the following formula (I)-1 are advantageously used. In the formula, $R^{11}$ is a divalent aromatic hydrocarbon residue.

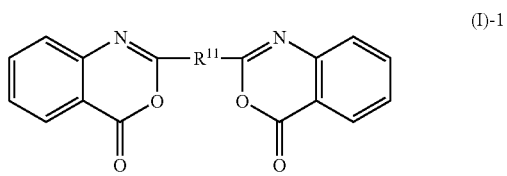

(I)-1

Of the compounds of the formula (I-1), 2,2'-p-phenylenebis(3,1-benzooxazin-4-one), 2,2'-(4,4'-diphenylene)bis(3,1-benzooxazin-4-one) and 2,2'-(2,6-naphthylene)bis(3,1-benzooxazin-4-one) are particularly preferred.

JP-A-59-12952 describes ultraviolet absorption properties of the above cyclic imino ester, for example, with regard to its typical compounds, and such compounds are hence incorporated herein by reference thereto.

In the present invention, preferably, the base material layer contains no inert particles, or if contained, they have such a small diameter or a small content that they have no influence on properties.

The thickness of the base material layer is preferably 1 to 500 μm for attaining strength and certain free flexibility required when it is used as a support for a liquid crystal, a hard coating, a touch panel, anti-dazzling treatment, an electromagnetic shielding film for PDP, organic EL, electron paper, solar cells, etc., or as a support in the fields of attachment to windows or automobiles. It is more preferably 12 to 350 μm, particularly preferably 50 to 250 μm.

<Easily Adhering Layer>

In the laminated film of the present invention, the easily adhering layer is formed on the base material layer. The easily adhering layer is comprised of a polymer binder. The easily adhering layer may further contain inert particles, a wetting agent, an aliphatic wax and additive particles.

(Polymer Binder)

The polymer binder is comprised of a polyester resin. While the polymer binder is preferably soluble or dispersible in water, there can be also preferably used a polymer binder that is soluble in water which contains an organic solvent to some extent.

As a polyester resin constituting the polymer binder, there can be used a polyester obtained from the following dicarboxylic acid component and diol component.

That is, examples of the dicarboxylic acid component include terephthalic acid, isophthalic acid, phthalic acid, anhydrous phthalic acid, 2,6-naphthalenedicarboxylic acid, 1,4-cyclohexanedicarboxylic acid, adipic acid, sebacic acid, trimellitic acid, pyromellitic acid, dimer acid and 5-sodium-sulfoisophthalic acid. As a polyester resin for constituting the polymer binder, it is preferred to use a copolyester obtained from two or more dicarboxylic acid components. The polyester resin may contain an unsaturated polybasic component such as maleic acid, itaconic acid or the like or a hydroxycarboxylic acid component such as p-hydroxybenzoic acid, or the like so long as the content thereof is very small.

Examples of the diol component include ethylene glycol, 1,4-butanediol, diethylene glycol, dipropylene glycol, 1,6-hexanediol, 1,4-cyclohexanedimethanol, xylene glycol, dimethylolpropane, etc., and also include poly(ethylene oxide) glycol and poly(tetramethylene oxide) glycol.

In the polyester resin constituting the polymer binder, the dicarboxylic acid component is preferably formed from 50 to 70 mol % of 2,6-naphthalenedicarboxylic acid. As other dicarboxylic acid component, terephthalic acid or isophthalic acid is preferred. The diol component is preferably formed from 80 to 95 mol % of ethylene glycol. As other diol component, diethylene glycol, or the like is preferred.

Therefore, the polyester resin constituting the polymer binder is preferably a polyester obtained from 50 to 70 mol % of 2,6-naphthalenedicarboxylic acid and 30 to 50 mol % of terephthalic acid or isophthalic acid for the dicarboxylic acid and from 80 to 95 mol % of ethylene glycol and 5 to 20 mol % of diethylene glycol for the diol component.

The glass transition temperature of the polyester resin is preferably 40 to 100° C., more preferably 60 to 80° C. Excellent adhesion and excellent scratch resistance of the easily adhering layer itself can be attained so long as the glass transition temperature is in the above range. On the other hand, when the glass transition temperature is too low, films are liable to cause a blocking, and when it is too high, the coating film comes to be hard and fragile, so that the laminated film is undesirably degraded in scratch resistance.

The intrinsic viscosity of the polyester resin is preferably 0.41 dl/g or more, more preferably 0.40 to 0.9 dl/g. The polyester resin to be used for the easily adhering layer can be produced in the same manner as in the production of the polymer for the base material layer.

The thickness of the easily adhering layer is in the range of 0.01 to 0.3 µm, preferably 0.02 to 0.25 µm. When the above thickness is too small, the adhesion strength is deficient. When it is too large, a blocking may take place or it may result in a large haze value.

(Inert Particles)

It is preferred to incorporate inert particles into the easily adhering layer. The inert particles refer to organic or inorganic inert particles, and examples of the inert particles include composite inorganic particles of silica and titania, calcium carbonate, calcium oxide, aluminum oxide, kaolin, silicon oxide, zinc oxide, crosslinked acrylic resin particles, crosslinked polystyrene resin particles, melamine resin particles, crosslinked silicone resin particles, and the like. Of these, crosslinked acrylic resin particles are preferred.

The inert particles preferably have an average particle diameter in the range of 40 to 120 nm. When the average particle diameter of the inert particles is too large, particles are liable to drop off. When it is too small, sufficient lubricity or scratch resistance may not be obtained in some cases. The content of the inert particles in coating agent for the easily adhering layer is preferably in the range of 0.1 to 10% by weight. When it is too small, no sufficient lubricity or scratch resistance can be obtained. When it is too large, undesirably, the easily adhering layer is degraded in cohesion and is poor in the property of adhesion.

(Wetting Agent)

It is preferred to incorporate a wetting agent into the easily adhering layer. The wetting agent includes anionic and nonionic e such as polyoxyethylene lauryl ether, polyoxyethylene alkylphenyl ether, polyoxyethylene-fatty acid ester, sorbitan fatty acid ester, glycerin fatty acid ester, fatty acid metal soap, alkyl sulfate, alkyl sulfonate, alkyl sulfosuccinate, and the like. The content of the wetting agent is preferably 1 to 10% by weight. When the amount of the wetting agent added is too small, no sufficient wettability to the polyester film is attained, and a coating agent is repelled. When it is too large, undesirably, the performance of the easily adhering layer is decreased.

(Aliphatic Wax)

It is preferred to incorporate an aliphatic wax into the easily adhering layer. The aliphatic fax improves the laminated film more in film surface lubricity. The content of the aliphatic wax is preferably 0.5 to 30% by weight, more preferably 1 to 10% by weight. When the above content is too small, undesirably, the lubricity of the film surface may not be obtained. When it is too large, undesirably, the adhesion to the polyester film base material or the easy adherence to the hard coating or an adhesive is sometimes insufficient.

Specific examples of the aliphatic wax include plant-origin waxes such as carnauba wax, candelilla wax, rice wax, haze wax, jojoba oil, palm wax, rosin-modified wax, ouricury wax, sugarcane wax, esparto wax, bark wax, etc., animal-origin waxes such as beeswax, lanolin, spermaceti wax, insect wax, Shellac wax, etc., mineral-origin waxes such as montan wax, ozokerite, ceresin wax, etc., petroleum-origin waxes such as paraffin wax, microcrystalline wax, petrolatum, etc., and synthetic hydrocarbon-origin waxes such as Fischer-Tropsch wax, polyethylene wax, polyethylene oxide wax, polypropylene wax, polypropylene oxide wax, and the like. Of these, carnauba wax, paraffin wax and polyethylene wax are particularly preferred in view of excellent in easy adhesion and lubricity to the hard coating or an adhesive. These are preferably used in the form of a water dispersion since a load on the environment can be decreased and since their handling is easy.

(Additive Particles)

For improvements in lubricity and scratch resistance, the easily adhering layer may contain other additive particles to such an extent that they do not influence transparency. Examples of the other additive particles include inorganic inert particles of each of calcium carbonate, magnesium carbonate, calcium oxide, zinc oxide, magnesium oxide, sodium silicate, aluminum hydroxide, iron oxide, zirconium oxide, barium sulfate, tin oxide, antimony trioxide, carbon black, molybdenum disulfate, etc., and particles of each of an acryl crosslinked polymer, a styrene crosslinked polymer, a silicone resin, a fluorine resin, a benzoguanamine resin, a phenolic resin, nylon resin, and the like. For avoiding sedimentation in a water dispersion, it is preferred to select particles whose specific gravity does not exceed 3 among these when the particles are formed of a solid substance insoluble in water.

The easily adhering layer for use in the present invention may contain resins different from the above compositions or other compound different from the above compounds, such as an antistatic agent, a colorant, a crosslinking agent, a ultraviolet absorbent, etc., as required for forming the coating layer.

(Solvent)

For forming a uniform easily adhering layer, the easily adhering layer component is applied onto the base material layer in a coating agent state where the easily adhering layer component is dissolved or dispersed in a solvent. While water can be used as a solvent, water containing an organic solvent to some extent may be used. The above solvent is removed in the step of forming a film after the easily adhering layer is formed, and it is preferably not contained in the final easily adhering layer.

<Method of Forming a Film>

In the laminated film of the present invention, the hard coating layer can be formed on the easily adhering layer by the following method after a film having the easily adhering layer formed on the base material layer is produced.

That is, the polyester for constituting the base material layer is melt-extruded in the form of a film and cooled to solidness with a casting drum to form an unstretched film. Then, the unstretched film is biaxially stretched at a stretch ratio of 2.0 to 5.0 in the longitudinal and transverse directions at Tg to (Tg+60)° C. Further, the stretched film is heat-set at a temperature of (Tm−100) to (Tm−5)° C. for 1 to 100 seconds. The above Tg represents the glass transition temperature of the polymer, and the above Tm represents the melting point of the polymer.

The stretching can be carried out by a generally employed method, such as a method using a roll or a method using a stenter. The stretching may be carried out simultaneously in the longitudinal and transverse directions; or may be carried out consecutively in the longitudinal and transverse directions. When the simultaneous stretching is carried out, the easily adhering layer is coated on the biaxially oriented film. When the consecutive stretching is carried out, preferably, the coating agent for the easily adhering layer is coated on the monoaxially oriented film that has been stretched in one direction, the monoaxially oriented film is stretched in the other direction as it is, and the film is heat-set. As a method of coating the easily adhering layer, a roll coating method, a gravure coating method, a roll brushing method, a spraying method, an air knife coating method, an impregnation method, a curtain coating method, and the like can be employed singly or in combination.

When relaxation is carried out, it is effective to carry out heat treatment at a temperature of (X−80) to X° C. of the film. The above X represents a heat-setting temperature. As a relaxation method, there is a method in which both edge portions of the film are detached somewhere in a heat-setting zone before the film is taken up around a roll but after its heat-setting, and the withdrawing rate relative to the film feed rate is decreased. Alternatively, there is a method in which the film is heated with an IR heater between two delivery rolls having different speeds. There is also a method in which the film is delivered onto a heating and delivery roll and the rate of a delivery roll following the heating and delivery roll is decreased. Further, there is another method in which the take-up rate relative to the feed rate is decreased while the film is delivered above a nozzle blowing hot air after heat-setting. Alternatively, there is a method in which the film is taken up with a film-forming machine, then, the film is delivered onto a heating and delivery roll and the speed of a delivery roll is decreased. Alternatively, there is another method in which, while the film is delivered through a heating oven or a heating zone using an IR heater, the speed of a roll provided after the heating zone is decreased to be smaller than the speed of a roll provided before the heating zone. Any one of the above methods can be employed. Preferably, the decrease ratio of the speed on the take-up side is adjusted to 0.1 to 10% based on the speed on the feed side to carry out the relaxation.

<Hard Coating Layer>

In the present invention, it is required to form a hard coating layer having the capability of absorbing ultraviolet on the easily adhering layer for improving the film in light resistance. For such a hard coating layer, there can be used a resin having the capability of absorbing ultraviolet as a material for forming the layer itself.

(Resin Having the Capability of Absorbing Ultraviolet)

As a resin having the capability of absorbing ultraviolet, an ultraviolet-absorbing polymer obtained by copolymerizing an acrylic monomer having benzophenone or benzotriazole as/on a side chain and other ethylenically unsaturated monomer is preferred.

The acrylic monomer having benzophenone as/on a side chain includes monomers represented by the following formula.

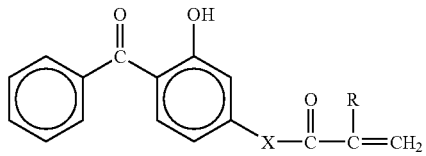

wherein R is a hydrogen atom or methyl, and X is —O—, —OCH$_2$CH$_2$O— or —OCH$_2$CH(CH$_3$)O—.

Specifically, the above acrylic monomer having benzophenone includes 2-hydroxy-4-acryloxybenzophenone, 2-hydroxy-4-methacryloyloxybenzophenone, 2-hydroxy-4-(2-acryloyloxy)ethoxybenzophenone, 2-hydroxy-4-(2-methacryloyloxy)ethoxybenzophenone, 2-hydroxy-4-(2-methyl-2-acryloyloxy)ethoxybenzophenone, 2-hydroxy-4-(2-methyl-2-methacryloyloxy)ethoxybenzophenone, and the like.

Of these, 2-hydroxy-4-acryloxybenzophenone or 2-hydroxy-4-methacryloyloxybenzophenone is particularly preferred.

The acrylic monomer having benzotriazole as/on a side chain includes monomers represented by the following formula.

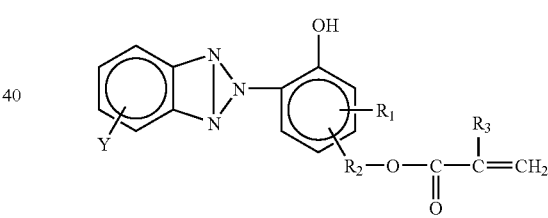

wherein Y is a hydrogen atom, a halogen atom or methyl, R$_1$ is a hydrogen atom or a hydrocarbon group having 1 to 6 carbon atoms, R$_2$ is an alkylene group having 1 to 6 carbon atoms and R$_3$ is a hydrogen atom or methyl.

Specifically, the above acrylic monomer having benzotriazole includes 2-[2'-hydroxy-5'-(methacryloyloxyethyl) phenyl]benzotriazole, 2-[2'-hydroxy-5'-(acryloyloxyethyl) phenyl]benzotriazole, 2-[2'-hydroxy-3'-t-butyl-5'-(methacryloyloxyethyl)phenyl]benzotriazole, 2-[2'-hydroxy-3'-methyl-5'-(acryloyloxyethyl)phenyl] benzotriazole, 2-[2'-hydroxy-5'-(methacryloyloxypropyl) phenyl]-5-chloro-benzotriazole, 2-[2'-hydroxy-5'-(acryloyloxybutyl)phenyl]-5-methylbenzotriazole, and the like.

Of these, 2-[2'-hydroxy-5'-(methacryloyloxyethyl)phenyl]benzotriazole or 2-[2'-hydroxy-5'-(acryloyloxyethyl) phenyl]benzotriazole is particularly preferred.

As other ethylenically unsaturated monomer, acrylic acid, methacrylic acid, alkyl ester of acrylic acid, alkyl ester of methacrylic acid, alkyl vinyl ether, alkyl vinyl ester, or the like is suitably used.

In the alkyl chain length of the alkyl ester of acrylic acid, alkyl ester of methacrylic acid and alkyl vinyl ether, and a carboxylic acid residue in the alkyl vinyl ester, the number of carbon atoms is preferably 1 to 8, more preferably 1 to 4.

The alkyl ester of acrylic acid includes methyl acrylate, ethyl acrylate, propyl acrylate, butyl acrylate, 2-ethylhexyl acrylate, etc., and the alkyl ester of methacrylic acid includes methyl methacrylate, ethyl methacrylate, propyl methacrylate, butyl methacrylate, and the like.

The alkyl vinyl ether includes methyl vinyl ether, ethyl vinyl ether and butyl vinyl ether. The alkyl vinyl ester includes vinyl formate, vinyl acetate, vinyl acrylate, vinyl butyrate, vinyl crotonate, and the like.

Concerning the copolymerization ratio of the acrylic monomer having benzophenone or benzotriazole as/on a side chain and the other ethylenically unsaturated monomer, the ratio of the acrylic monomer having benzophenone or benzotriazole as/on a side chain is 10 to 70% by weight, preferably 20 to 65% by weight, and the ratio of the other ethylenically unsaturated monomer is 30 to 90% by weight, preferably 35 to 80% by weight. When the ratio of the monomer having the ultraviolet absorbing function is less than the lower limit, the absorption start wavelength $\lambda s$ of the hard coating layer is shorter than the absorption wavelength of the polyester resin of the base material layer, so that the ultraviolet absorption performance decreases. When the ratio of the monomer having the ultraviolet absorbing function exceeds the upper limit, the hard coating layer is fragile, and no desired pencil hardness can be attained. The absorption start wavelength $\lambda s$ of the hard coating layer is preferably 385 to 390 nm.

The ultraviolet-absorbing polymer preferably has a weight average molecular weight of 5,000 to 1,000,000, more preferably 10,000 to 800,000.

The coating agent to be used for forming the above hard coating layer preferably contains 0.3 to 3 parts by weight, per 100 parts by weight of the resin component, of inert fine particles having a secondary particle diameter of 20 µm or less for the purpose of adjusting a gloss and imparting surface lubricity. When the above amount is less than 0.3 part by weight, there is produced a poor effect on an improvement in lubricity. On the other hand, when it exceeds 3 parts by weight, the pencil hardness of the hard coating layer obtained is sometimes decreased.

Examples of the inert particles to be added to the coating agent include inorganic particles such as silica, magnesium carbonate, aluminum hydroxide, barium sulfate, etc., and besides these, they include particles of an organic polymer such as polycarbonate, an acrylic resin, polyimide, polyamide, polyethylene naphthalate, a melamine resin, or the like.

The coating method for forming the hard coating layer can be selected from conventional methods that are known per se, such as roll coating, gravure coating, bar coating, extrusion coating and the like as required depending upon properties and coating amount of the coating agent. Although not specially limited, the thickness of the hard coating layer is preferably in the range of 1 to 15 µm. The concentration of a solid content in the coating agent is 30 to 70% by weight, and further, it is preferably 40 to 60% by weight.

The hard coating layer is not specially limited in any point so long as it is formed on the easily adhering layer. There may be also employed a constitution including a functional layer such as a gas barrier layer or an electrically conductive layer on the hard coating layer. In the laminated film of the present invention, therefore, the hard coating layer (H), the base material layer (S) and the easily adhering layer (B) have a basic constitution of H/B/S or H/B/S/B/H. Further, when it has a functional layer (F), the constitution is F/H/B/S, H/B/S/F, F/H/B/S/B/H or H/B/S/B/H/F.

(Absorption Wavelength)

In the hard coating layer, preferably, the absorption wavelength $\lambda$ of the polyester resin forming the base material layer and the absorption start wavelength $\lambda s$ of the hard coating layer satisfy the relationship of $\lambda \leq \lambda s \leq 400$ nm. When $\lambda s$ is smaller than $\lambda$, undesirably, there is produced no effect on the improvement in light resistance. Further, when $\lambda s$ is greater than 400 nm, the film is colored, so that the film is sometimes not usable in the field of displays. The above absorption wavelength $\lambda$ of the polyester resin refers to a wavelength at which the transmittance measured with a spectrophotometer comes to be 20%. Further, the absorption start wavelength $\lambda s$ of the hard coating layer refers to a wavelength at which the transmittance measured with a spectrophotometer comes to be 20% lower than the transmittance at 550 nm.

When the base material layer contains an ultraviolet absorbent, the absorption wavelength $\lambda$ of the polyester resin of the base material layer and the absorption start wavelength $\lambda ps$ of the ultraviolet absorbent contained in the base material layer satisfy $\lambda < \lambda ps$. The above absorption start wavelength $\lambda ps$ of the ultraviolet absorbent refers to a wavelength at which the transmittance measured with a spectrophotometer comes to be 20% lower than the transmittance at 550 nm.

(Light Resistance)

In the laminated film of the present invention, the variation ($\Delta b^*$) between transmittance $b^*$ values obtained before and after a 300 hours' xenon arc test of the laminated film is less than 2.0, preferably less than 1.0. When the transmittance $b^*$ value exceeds the upper limit, the film is colored in yellow, so that the film is sometimes not usable in the field of displays.

(Pencil Hardness of Hard Coating Layer Surface)

In the laminated film of the present invention, preferably, the pencil hardness of the hard coating layer surface is H or higher. When the above pencil hardness is H or lower, the laminated film is liable to be scratched and is not desirable in the field of displays. The above pencil hardness is more preferably 2H or higher, still more preferably 3 H or higher.

(Transparency)

In the laminated film of the present invention, preferably, the total light transmittance in the visible light wavelength region is at least 85%. When the total light transmittance is low, the laminated film is undesirable for use in an optical field due to a decrease in the sharp brightness of a display screen, and the like. It is more preferably at least 87%, still more preferably at least 90%. Further, the haze is preferably less than 1%. When the haze is high, the visibility in the field of displays is impaired, which is undesirable for use in an optical field. It is more preferably less than 0.8%, still more preferably less than 0.5%.

(Dimensional Stability)

The laminated film of the present invention preferably has a heat shrinkage factor, measured at 150° C. for 30 minutes, of less than 2%. When it is 2% or more, a laminated material undergoes cracking, or wrinkles are formed, when or after the functional layer is stacked on the film, so that no sufficient functions may be exhibited due to the breakage of the laminated material, and the like. It is more preferably less than 1%, still more preferably less than 0.5%. The laminated material of the present invention may be treated at a high temperature for producing properties of the functional layer. When such a case is taken into account, it is preferred that the heat shrinkage factor measured even at 200° C. for 10 minutes should be less than 2%. It is more preferably less than 1%, still more preferably less than 0.5%.

EXAMPLES

Various property values and properties in the present invention were measured, and are defined, as follows.

(1) Film Thickness

A film was measured for a thickness at a stylus pressure of 30 g with an electron micrometer (K-312A model, supplied by Anritsu K.K.).

(2) Haze, Total Light Transmittance

A 50 mm×50 mm sample piece was measured for a total light transmittance Tt (%) and a diffused light transmittance Td (%) with a haze meter, trade name "NDH2000" supplied by Nippon Denshoku Kogyo K.K., according to JIS K-7105, and a haze ((Td/Tt)×100) (%) was calculated and evaluated on the basis of the following ratings.

Total light transmittance

○ Total light transmittance is 85% or more . . . Excellent in transparency

Δ Total light transmittance is at least 80% but less than 85% . . . Transparency is poor to some extent.

× Total light transmittance is less than 80% . . . Poor transparency

Haze

○ Haze is less than 1% . . . Excellent in transparency

Δ Haze is 1% or more but less than 1.5% . . . Transparency is poor to some extent.

× Haze is 1.5% or more . . . Transparency is poor.

(3) Evaluation of Light Resistance

A film was subjected to an outdoor exposure acceleration test in a 65° C. and 50 RH % environment for an exposure time period of 300 hours with a xenon arc weatherometer (trade name "Suntest CPS", model "CPS+", supplied by Toyo Seiki Seisaku-sho, Ltd.) according to JIS-K-7350-2. The treated film was measured for a transmittance b* value based on L*a*b* color system with a color difference meter (SZ) supplied by Nippon Denshoku Kogyo, to determine a post-treatment difference Δb*, and the film was evaluated on the basis of the following ratings.

◎ Δb* value is less than 1.0 . . . Light resistance is remarkably excellent.

○ Δb* value is 1.0 or more but less than 2.0 . . . Light resistance is excellent.

Δ Δb* value is 2.0 or more but less than 4.0 . . . Light resistance is poor to some extent.

× Δb* value is 4.0 or more . . . Light resistance is poor.

(4) Adhesion of Hard Coating Layer

A 5 μm thick hard coating layer was formed on an a coating surface of a polyester film and cross-cut in the form of a gridiron (100 squares having a size of 1 mm×1 mm each), and a 24 mm width scotch tape (supplied by Nichiban Co., Ltd.) was attached thereon. And, the tape was rapidly peeled off along the attached tape direction and in a direction in parallel with the hard coating layer surface, and this operation was carried out three times. A peeled surface was observed, and the result was evaluated on the basis of the following ratings.

○ The area of a peeled surface is less than 20% . . . Adhesion strength is remarkably excellent.

Δ The area of a peeled surface is 20% or more but less than 40% . . . Adhesion strength is poor to some extent.

× The area of a peeled surface is 40% or more . . . Adhesion strength is very poor.

(5) Pencil Hardness

Pencils having various hardness values were pressed on a film layer at an angle of 90 degrees, the film was scratched with the pencils under a load of 1 kg, and pencil hardness was measured when scratches occurred, according to JIS K-5400. The pencil hardness on the hard coating layer side was evaluated on the basis of the following ratings.

◎ Pencil hardness of 3H or higher . . . Scratch resistance is remarkably excellent.

○ Pencil hardness of H or higher but lower than 3H . . . Scratch resistance is excellent.

× Pencil hardness of lower than H . . . Scratch resistance is poor.

(6) Dimensional Stability

A film sample was marked at an interval of 30 cm, heat-treated in an oven (200° C.×10 minutes) under no load, a distance between the marks was measured after the heat treatment, a heat shrinkage factor was calculated on the basis of the following expression, and the film sample was evaluated for dimensional stability on the basis of the following ratings.

Heat shrinkage factor (%)=(distance between marks before heat treatment−distance between marks after heat treatment)/distance between marks before heat treatment× 100

○ Heat shrinkage factor is less than 2% . . . Dimensional stability is remarkable.

Δ Heat shrinkage factor is 2% or more but less than 4% . . . Dimensional stability is normal.

× Heat shrinkage factor is 4% or more . . . Dimensional stability is poor.

(7) Absorption Wavelength

For an absorption wavelength λ of a polyester resin, light transmittances in a wavelength region of 300 to 800 nm were continuously measured with a double beam type spectrophotometer (trade name "UV-3100PC", supplied by Shimadzu Corporation), and a wavelength at which the light transmittance came to be 20% was used as an absorption wavelength λ.

For an absorption start wavelength λs of a hard coating layer, a film was formed on a glass and measured for a light transmittance in a region of 300 to 800 nm with the above spectrophotometer, and a wavelength at which the light transmittance came to be lower than a light transmittance found at 550 nm by 20% was used as an absorption start wavelength.

Example 1

(Polyester for Base Material Layer)

An ester exchange reaction between 100 parts of dimethyl naphthalene-2,6-dicarboxylate and 60 parts of ethylene glycol was carried out in the presence of 0.03 part of manganese acetate tetrahydrate as an ester exchange catalyst for 120 minutes while the mixture was gradually temperature-increased from 150° C. to 238° C. When the reaction temperature reaches 170° C. during the above process, 0.024 part of antimony trioxide was added, and after completion of the ester exchange reaction, trimethyl phosphate (solution prepared by heat-treating it, under a pressure of 0.11 to 0.16 MPa in ethylene glycol at 135° C. for 5 hours: 0.023 part as trimethyl phosphate) was added. Then, the reaction product was recharged into a polymerizer, temperature-increased up to 290° C. and allowed to undergo a polycondensation reaction under a high vacuum of 27 Pa or less, and after completion of the polymerization, 1% by weight, per 99% by weight of a polymer, of an ultraviolet absorbent of the formula (A) was added, to give polyethylene-2,6-naphthalenedicarboxylate having an intrinsic viscosity of 0.61 dl/g and containing substantially no particles, as a material for forming a base material layer film.

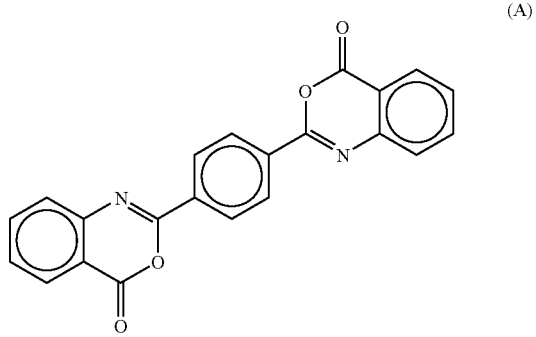

(A)

(Easily Adhering Coating Agent)

A coating agent containing 85 parts by weight of a polyester, 5 parts by weight of inert particles and 10 parts by weight of a wetting agent was dissolved in ion-exchange water to prepare a material for forming an easily adhering layer. The above polyester (Tg=80° C.) used in the coating agent was constituted from 2,6-naphthalenedicarboxylic acid 65 mol %/isophthalic acid 30 mol %/5-sodiumsulfoisophthalic acid 5 mol % as an acid component and ethylene glycol 90 mol %/diethylene glycol 10 mol % as a glycol component. The inert particles were crosslinked acryl inert particles (average particle diameter 60 nm). The wetting agent was polyoxyethylene (n=7) lauryl ether.

(Film Formation)

Pellets of the above polyethylene-2,6-naphthalenedicarboxylate were dried at 170° C. for 6 hours, fed to an extruder hopper and melted at a melting temperature of 305° C., and the melt was filtered with a stainless steel wire filter having openings of 17 μm, extruded on a rotary cooling drum having a surface temperature of 60° C. through a 3 mm slit-shaped die, and rapidly cooled to give an unstretched film. The thus-obtained unstretched film was pre-heated at 120° C. and stretched 3.1 times longer in the longitudinal direction between low-speed and high-speed rolls under heat with a 900° C. IR heater 15 mm above the film. The above coating agent for forming an easily adhering layer was coated on one surface of the above longitudinally stretched film with a roll coater such that a dry easily adhering layer had a thickness of 0.1 μm.

Then, the film was supplied to a tenter and stretched 3.5 times wider in the transverse direction at 145° C. The resultant biaxially oriented film was heat-set at a temperature of 240° C. for 40 seconds to give a highly transparent polyester film having a thickness of 75 μm. An agent ① (trade name "ULS-1395LH" supplied by Ipposha Oil Industries Co., Ltd.) (the agent ① had been prepared by dissolving 30% by weight of 2-[2'-hydroxy-5'-(methacryloyloxyethyl)phenyl]benzotriazole and 70% by weight of a methyl methacrylate monomer in a solvent mixture of toluene with ethyl acetate, temperature-increasing the mixture up to 70° C. in a reactor and carrying out a polymerization for 8 hours. The agent had a solid content of 30% by weight) was applied onto the easily adhering layer side of the obtained film by a roll coating method for forming a hard coating layer, such that a dry layer had a thickness of 5 μm, and the applied agent was dried at 100° C. for 2 minutes and aged at 23° C. for 2 days to form a hard coating layer.

The thus-obtained film was measured for properties, and Table 1 shows the results. The obtained film was a film excellent in light resistance, scratch resistance, transparency, dimensional stability and adhesion to the hard coating layer.

Example 2

A laminated polyester film was obtained in the same manner as in Example 1 except that the polymer for forming a base material layer contained no ultraviolet absorbent.

The thus-obtained film was measured for properties, and Table 1 shows the results. While the obtained film was inferior to the film of Example 1 in light resistance, it was a film excellent in scratch resistance, transparency, dimensional stability and adhesion to a hard coating layer.

Examples 3 and 4

Laminated polyester films were obtained in the same manner as in Example 1 except that the polymer for forming a base material layer contained no ultraviolet absorbent and that the hard coating agent was replaced with agents (agent ② and agent ③) having ultraviolet-absorbing monomer contents shown in Table 1.

The thus-obtained film was measured for properties, and Table 1 shows the results. While the obtained films were inferior to the film of Example 1 in light resistance, they were films excellent in scratch resistance, transparency, dimensional stability and adhesion to a hard coating layer.

Comparative Example 1

(Polyester for Base Material Layer)

A reactor was charged with 96 parts of methyl terephthalate, 58 parts of ethylene glycol, 0.038 part of manganese acetate and 0.041 part of antimony trioxide, and an ester exchange reaction was carried out with stirring until the temperature inside the reactor came to be 240° C. while methanol was distilled off. After completion of the ester exchange reaction, 0.097 part of trimethyl phosphate was added. Then, the reaction product was temperature-increased and, finally, a polycondensation was carried out under conditions of high vacuum and 280° C., to give chips of polyethylene terephthalate having an intrinsic viscosity ([η]) of 0.64.

(Coating Agent for Easily Adhering Layer)

The same coating agent for an easily adhering layer as that used in Example 1 was used.

(Coating Agent for Hard Coating Layer)

The same coating agent as that used in Example 1 was used.

(Film Formation)

Then, the above chips of polyethylene terephthalate were dried at 170° C. for 3 hours, fed into a twin-screw extruder and melt-kneaded at 280° C., and the melt was rapidly cooled to solidness to obtain master chips for forming a base material layer film.

The above pellets of polyethylene terephthalate were dried at 160° C. for 3 hours, then, fed into an extruder hopper and melted at a melting temperature of 295° C., and the melt was rapidly cooled to solidness on a cooling drum maintained at 20° C., to give an unstretched film. The unstretched film was stretched 3.5 times longer in the longitudinal direction at 95° C., and the same coating agent for an easily adhering layer as that used in Example 1 was applied such that a dry layer had a thickness of 0.1 μm. The film was stretched 3.8 times wider in the transverse direction at 110° C. and then heat-treated at 230° C., to give a biaxially oriented film having a thickness of 75 μm. A hard coating layer was formed on the thus-obtained polyester film to give a laminated polyester film in the same manner as in Example 1.

The obtained film was measured for properties, and Table 1 shows the results. While the obtained film was a film excellent in light resistance, scratch resistance, transparency and adhesion to the hard coating layer, it was inferior to the film of Example 1 in dimensional stability.

Comparative Example 2

First, a film having a base material layer and an easily adhering layer was obtained in the same manner as in Example 1 except that a polymer for forming a base material layer contained no ultraviolet absorbent. An acryl hard coating containing acryl-modified silica particles having no ultraviolet-absorbing function (trade name "Z7501" supplied by JSR Corporation, agent ④, solvent: methyl ethyl ketone, solid content 50%) was coated thereon by a roll coating method such that a dry film had a thickness of 5 μm, and the applied agent was dried and irradiated with electron beam under conditions of 175 kV and 10 Mrad, to form a hard coating layer.

The thus-obtained film was measured for properties, and Table 1 shows the results. While the obtained film was a film excellent in scratch resistance, transparency, dimensional stability and adhesion to the hard coating layer, it was very poor in light resistance.

Comparative Example 3

First, a base material layer film was obtained in the same manner as in Example 1 except that 0.25% by weight of spherical silica (average particle diameter 0.4 μm, refractive index 1.44) was added, as a lubricant, to a polymer for forming a base material layer and that no easily adhering layer was formed. A hard coating layer was formed on the above film in the same manner as in Comparative Example 2, to obtain a laminated film.

The thus-obtained film was measured for properties, and Table 1 shows the results. While the obtained film was a film excellent in scratch resistance and dimensional stability, it was poor in transparency and very poor in light resistance and adhesion to the hard coating layer.

Comparative Example 4

A laminated film was obtained in the same manner as in Example 1 except that a polymer for forming a base material layer film contained no ultraviolet absorbent and that the hard coating agent was replaced with an agent (agent ⑤) having an ultraviolet-absorbing monomer content shown in Table 1.

The thus-obtained film was measured for properties, and Table 1 shows the results. While the obtained film was a film excellent in scratch resistance, transparency, dimensional stability and adhesion to a hard coating layer, it was very poor in light resistance due to λs<λ.

Comparative Example 5

First, a film having a base material layer and an easily adhering layer was obtained in the same manner as in Comparative Example 1. A hard coating layer was formed on the film in the same manner as in Comparative Example 2, to obtain a laminated film.

The thus-obtained film was measured for properties, and Table 1 shows the results. While the obtained film was a film excellent in scratch resistance, transparency and adhesion to a hard coating layer, it was very poor in light resistance and inferior in dimensional stability.

Comparative Example 6

A laminated film was obtained in the same manner as in Example 1 except that a polymer for forming a base material layer film contained no ultraviolet absorbent and that the hard coating agent was replaced with an agent (agent ⑥) having an ultraviolet-absorbing monomer content shown in Table 1.

The thus-obtained film was measured for properties, and Table 1 shows the results. While the obtained film was a film excellent in light resistance, transparency, dimensional stability and adhesion to a hard coating layer, it was very poor in scratch resistance.

TABLE 1

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Base material layer | Polyester | | | PEN | | PET | | PEN | | PET | PEN |
| | Absorption wavelength λ(nm) | | | 382 | | 320 | | 382 | | 320 | 382 |
| | Lubricant | | | No | | | Yes | | | No | |
| | Ultraviolet absorbent | Yes | | No | | | Yes | | No | | |
| Easily adhering layer | Easily adhering layer | | | Yes | | | No | | | Yes | |
| Hard coating layer | Hard coating agent | Agent ① | Agent ② | Agent ③ | | Agent ① | Agent ④ | Agent ⑤ | Agent ④ | Agent ⑥ | |
| | Ultraviolet absorptivity | | | Yes | | | No | | Yes | No | Yes |
| | Absorption start wavelength λs(nm) | 387 | 385 | 390 | | 387 | — | — | 375 | — | 395 |

TABLE 1-continued

| | | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| | Ultraviolet-absorbing monomer content (wt %) | 30 | | 20 | 50 | 30 | — | — | 5 | — | 80 |
| Properties evaluated | Variation of b* value | ◎ | ○ | ○ | ○ | ◎ | X | X | X | △ | ○ |
| | Pencil hardness | ○ | ○ | ○ | ○ | ○ | ◎ | ◎ | ◎ | ◎ | X |
| | Haze | ○ | ○ | ○ | ○ | ○ | ○ | X | ○ | ○ | ○ |
| | Total light transmittance | ○ | ○ | ○ | ○ | ○ | ○ | △ | ○ | ○ | ○ |
| | Dimensional stability | ○ | ○ | ○ | ○ | △ | ○ | ○ | ○ | △ | ○ |
| | Adhesion of hard coating layer | ○ | ○ | ○ | ○ | ○ | ○ | X | ○ | ○ | ○ |
| Comprehensive evaluation | | ◎ | ○ | ○ | ○ | △ | X | X | X | X | X |

In Table, PEN represents polyethylene-2,6-naphthalenedicarboxylate, and PET represents polyethylene terephthalate.

EFFECT OF THE INVENTION

The laminated film of the present invention has excellent transparency and has the following excellent properties. That is, in the laminated film of the present invention, the hard coating layer has a ultraviolet-absorbing function and has a Δb* value less than the predetermined value, and the laminated film of the present invention is excellent in light resistance. Further, since the hard coating layer surface has a pencil hardness of H or higher, the laminated film is excellent in scratch resistance. Further, the polyester resin formed from naphthalenedicarboxylic acid as a main dicarboxylic acid component and ethylene glycol as a main glycol component is used for the base material layer, so that the laminated film is excellent in dimensional stability. Further, since the easily adhering layer is positioned between the base material layer and the hard coating layer, the laminated film is excellent in adhesion to the hard coating layer.

INDUSTRIAL UTILITY

The laminated film of the present invention is excellent in light resistance, scratch resistance, transparency, dimensional stability and adhesion to a hard coating layer, so that the laminated film of the present invention can be used as a base film for a prism lens sheet, a touch panel, a backlight, etc., which are members of a liquid crystal display, or as various optical films such as a base film for an anti-reflection film, an electromagnetic wave shielding film for a plasma display, a base film for an organic EL display, an anti-exposure base film for a display, and the like.

The invention claimed is:

1. A laminated film comprising a base material layer, an easily adhering layer and a hard coating layer, wherein the easily adhering layer is formed on the base material layer and the hard coating layer is formed on the easily adhering layer, and further wherein (1) the base material layer is formed of a polyester resin formed from naphthalenedicarboxylic acid as a main dicarboxylic acid component and ethylene glycol as a main glycol component, (2) the hard coating layer has an ultraviolet absorbing function and has a pencil hardness of H or higher on the hard coating layer surface, and (3) the easily adhering layer is formed of a polyester resin obtained from 50 to 70 mol % of 2,6-naphthalenedicarboxylic acid and 30 to 50 mol % of terephthalic acid or isophthalic acid as a dicarboxylic acid component and from 80 to 95 mol % of ethylene glycol and 5 to 20 mol % of diethylene glycol as a diol component, and the polyester resin of the easily adhering layer has a glass transition temperature of 40 to 100° C., (4) said laminated film has a variation (Δb*) of less than 2.0 between transmittance b* values obtained before and after a 300 hours xenon arc test of said laminated film.

2. The laminated film of claim 1, which satisfies the relational expression of $\lambda \leq s \leq 400$ nm in which $\lambda$ is an absorption wavelength of the polyester resin of the base material layer and $\lambda s$ is an absorption start wavelength of the hard coating layer.

3. The laminated film of claim 1 or 2, which has a heat shrinkage factor of less than 2% in 200° C.×10 minutes.

4. The laminated film of claim 1, which has a total light transmittance of 85% or more in the visible light wavelength region.

5. The laminated film of claim 1, which has a haze of less than 1%.

6. The laminated film of claim 1, wherein the polyester resin of the base material layer contains an ultraviolet absorbent.

7. The laminated film of claim 1, wherein the polyester resin of the base material layer is comprised of at least 90 mol % of an ethylene-2,6-naphthalenedicarboxylate unit.

8. The laminated film of claim 1, wherein the easily adhering layer contains inert particles.

9. The laminated film of claim 1, wherein the hard coating layer is formed of a copolymer from an acrylic monomer having benzophenone or benzotriazole as/on a side chain and other ethylenically unsaturated monomer.

10. The laminated film of claim 9, wherein the acrylic monomer having benzophenone as/on a side chain is 2-hydroxy-4-acryloxybenzophenone or 2-hydroxy-4-methacryloyloxybenzophenone.

11. The laminated film of claim 9, wherein the acrylic monomer having benzotriazole as/on a side chain is 2-[2'-hydroxy-5'-(methacryloyloxyethyl)phenyl]benzotriazole or 2-2'-hydroxy-5'-(acryloyloxyethyl)phenyl] benzotriazole.

12. The laminated film of claim 9, wherein the other ethylenically unsaturated monomer is at least one monomer selected from the group consisting of acrylic acid, methacrylic acid, alikyl ester of acrylic acid and alikyl ester of methacrylic acid.

13. The laminated film of claim 9, wherein the hard coating layer is formed of a copolymer obtained by copolymerization of 10 to 70% by weight of an acryl monomer having benzophenone or benzotriazole as/on a side chain and 30 to 90% by weight of other ethylenically unsaturated monomer.

* * * * *